United States Patent [19]

Isono

[11] 4,162,123

[45] Jul. 24, 1979

[54] AUTOMATIC FOCUSING SYSTEM

[75] Inventor: Tadao Isono, Kokubunji, Japan

[73] Assignee: Nihon Beru-Haueru Kabushiki Kaisha, Tokyo, Japan

[21] Appl. No.: 855,582

[22] Filed: Nov. 29, 1977

[30] Foreign Application Priority Data

Nov. 30, 1976 [JP] Japan .................................. 51/143000

[51] Int. Cl.² ............................................... G03B 7/08
[52] U.S. Cl. ......................................... 354/25; 354/31
[58] Field of Search ...................... 354/25, 31; 250/201

[56] References Cited

U.S. PATENT DOCUMENTS 4,095,241  6/1978  Matsumoto ............................ 354/31

Primary Examiner—Russell E. Adams
Attorney, Agent, or Firm—Aaron Passman; Kirk M. McInerney; Roger M. Fitz-Gerald

[57] ABSTRACT

A technique is shown for automatically adjusting the sensitivity of an auto focus device in accordance with the level of light intensity of the subject. Sensitivity correction is required because the timing of the automatic focus signal is directly related to the intensity of the light from the subject. In systems where the timing of the automatic focus signal is used to determine the distance of the subject from the camera signal, correction is absolutely essential. A supplementary photo cell is used to measure the light coming from the subject and set the sensitivity of the automatic focus system.

7 Claims, 5 Drawing Figures

AUTOMATIC FOCUSING SYSTEM

BACKGROUND OF THE INVENTION

Automatic focusing systems are known which use photo sensitive cells to determine whether the optical system for a camera is correctly focused. Such photo cells are used with a dithered signal from the subject; in such systems a peak signal is indicative of proper focus and may be used to adjust the camera lens. The photo sensitive materials necessary for such automatic focus systems present a problem with conditions of low level light emanating from the subject. The response time of the automatic focusing system photo sensitive cell is slowed causing a delay in the transmission of the peak signal. Such a delay is not incurred when the light levels are adequate as the response time of the photo sensitive cell is acceptable under such conditions.

It is therefore an object of the invention to provide an automatic focusing system which includes a system by which the delay incurred during sensing of the subject in low light conditions is corrected to provide a proper signal for focusing.

SUMMARY OF THE INVENTION

The device for sensing the light level emanating from the subject and for adjusting the automatic focusing apparatus in the camera in accordance with the level of light is disclosed; it includes a supplementary photo sensitive cell and electronic circuitry for modifying the timing of the reference pulse relative to the peak signal pulse from the auto focus detector. More particularly, there is disclosed a one shot multi vibrator circuit which delays the timing of the reference pulse in accordance with the lack of light in low light situations. The delay of the reference pulse and the delay of the peak signal pulse from the auto focus detector are thus both responsive to the low light level emanating from the subject and as such the distance between the subject and the camera which is a function of the timing of the reference pulse and the peak signal is correct even under conditions of low light.

The focusing may be controlled by an automatic rangefinder of the type generally described in U.S. Pat. No. 4,002,899 assigned to Honeywell, Inc. Such automatic rangefinders are called the Honeywell Visitronics module and include two optical paths that bring light from the subject to photo sensitive detectors responsive to the fact that both optical paths are aligned with one another and are directed toward the same subject. Such alignment causes the detector to generate a peak pulse (greater than any other) which pulse can be used to adjust the focus of the camera lens. One of the optical paths is fixed relative to the rangefinder and camera lens and the other is moveable so as to scan along the other optical path. Rangefinding is accomplished by triangulation and comparison of the image from the fixed path with the image from the scanning path. By means of suitable electronic circuitry the peak signal can be converted to a control signal for the focusing motor.

DETAILED DESCRIPTION OF THE DRAWINGS

Figure 1:
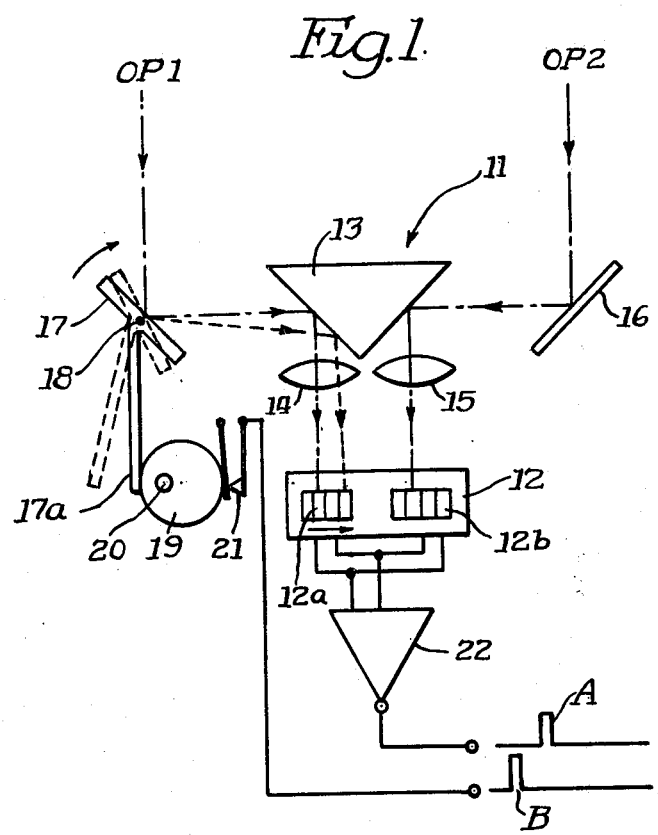
FIG. 1 is a schematic drawing of the prior art automatic focusing system.

FIG. 1 shows a conventional rangefinding type automatic focusing device generally labeled 11. Such devices have two optical paths OP1 and OP2 leading from the subject to a photo responsive cell and integrated circuit combination such as the Honeywell Visitronics module 12. In order to direct the optical paths OP1 and OP2 into the module 12 there is a prism 13 and a pair of lenses 14 and 15. Lens 14 is in optical path OP1 and lens 15 is in optical path OP2. OP2 includes a fixed mirror 16 for directing OP2 into prism 13 and OP1 includes a pivotally moveable scanning mirror 17 for directing OP1 into prism 13. The scanning mirror 17 moves pivotally upon an axis 18 such that OP1 varies angularly to intersect OP2 over a range falling within the distance of near focus to far focus (infinity.) An eccentrically mounted disk 19 pivots about pivot point 20 permitting mirror 17 to scan a limited range because disk 19 rubs against follower arm 17a of mirror support 17. Also riding against disk 19 is a normally opened switch 21 which closes as follower arm 17a is on the heel of eccentric of the mounted disk 19 such that as the pivotal mirror 17 is pointed toward far focus, switch contacts of switch 21 are closed. The power supply for switch 21 (not shown) is used to supply a signal pulse as switch 21 closes. A pulse is shown schematically as B in FIGS. 1 and 2.

Figure 2:
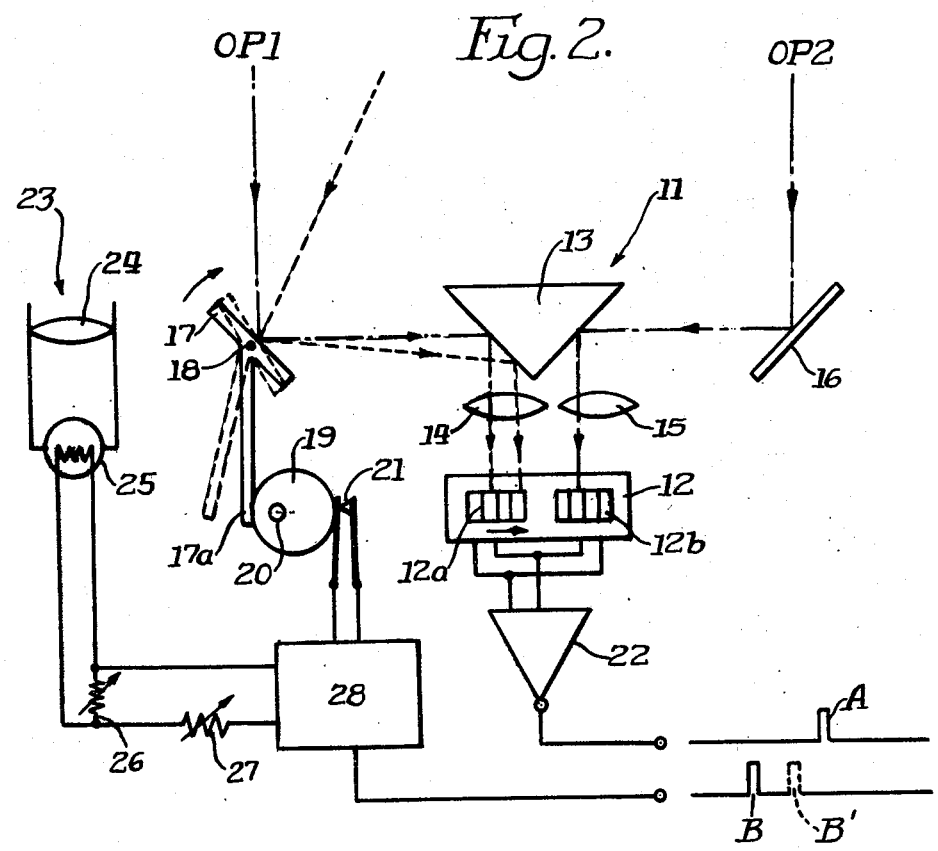
FIG. 2 shows a similar schematic drawing of an automatic focusing system which includes the improvement of a compensating device for the delay in response of the photo detector.

The module 12 includes photo responsive cells 12a and 12b which are typical in that in low level light situations their response time is delayed. The output of photo responsive cells 12a and 12b are schematically shown connected to a differential amplifier 22. Amplifier 22 is arranged to compare the signals from cells 12a and 12b and issue a peak pulse when the signals are in coincidence. That is to say that when OP2 and OP1 are aligned on the same subject a peak pulse as shown as A in FIGS. 1 and 2 is generated. The components in FIGS. 1 and 2 are identical and have the same reference numerals. As is clear from FIG. 1, there is a time delay between pulse A and pulse B which is a function of the amount which the lens used for taking pictures is out of focus.

While the following is not shown, those skilled in the art will appreciate that the scanning mirror 17 may be coupled to the camera lens such that the scanning range is directly coupled to the focus position of the camera lens. That is to say that when the lens is set for focus in near range the scanning mirror scans from near focus to mid focus. Should the subject be at far focus the peak pulse will be generated when the mirror is near the end of its travel and points toward infinity such that OP1 is nearly parallel to OP2. Accordingly the time difference between the peak pulse A emanating from the differential amplifier 22 and the reference pulse B emanating from the normally opened switch 21 will be spaced apart in time relation such that a signal can be derived to drive the lens to the far focus position thus shifting the scanning mirror centering point from its position between near focus and mid focus to somewhere between mid focus and far focus and thus closing in on the correct focusing position for the camera lens. The foregoing all pre-supposes that the light level of the light transmitted along OP1 and OP2 from the subject to the mirros 16 and 17 is sufficient to illuminate the cells 12a and 12b in module 12 so that their output is nearly instantaneous.

Under conditions of low light emanating from the subject along OP1 and OP2 the response time of 12a and 12b is delayed such that an error in induced in the time relationship between pulse A and pulse B since the time relationship of pulse A and pulse B is directly related to the instructions for focusing the camera lens. The automatic focusing device 11 will not work properly unless there is something to compensate for the delay induced by low level light emanating from the subject. Such a compensating device is labeled 23 and is shown in FIG. 2 as an adjunct to the basic mechanism 11 shown in FIG. 1. Compensating device 23 includes a lens 24 which is directed generally in the direction of the subject and gathers light therefrom for a photo responsive element 25 such as a Cds cell.

The information gathered by cell 25 is used to delay the signal emanating from switch 21 in proportion to the amount of light emanating from the subject. That is to say that under low light conditions wherein the pulse A is delayed because of the response time of cells 12a and 12b, the reference pulse B can be similarly delayed in accordance with the lack of light emanating from the subject. The circuitry necessary to perform the delay includes two variable resistors 26 and 27; resistor 26 is in parallel with the leads from cell 25 and resistor 27 is in series with a lead from cell 25. Variable resistors 26 and 27 are included to fine tune the circuit for purposes of initial calibration.

A one shot multi vibrator 28 is also connected to the leads from the cell 25 beyond the connections of resistors 26 and 27. The multi vibrator 28 is responsive to the switch 21. In a manner well known and in accordance with the purpose of the invention the one shot multi vibrator 28 receives the reference pulse B from switch 21 and stores the reference pulse B for predetermined amount of time delay per the adjustment of variable resistors 26 and 27 and the output of the cell 25. FIG. 2 shows the dashed pulse B' which denotes the delayed reference pulse from switch 21 caused by the compensating device 23. It will be noted that the time relationship between pulse A and pulse B' in FIG. 2 is the same as the time relationship between pulse A and pulse B in FIG. 1. Thus, under conditions of low light level the compensating device 23 in FIG. 2 induces delay in reference pulse which compensates for the lack of light i.e. the delayed response time of cells 12a and 12b.

Figure 3:
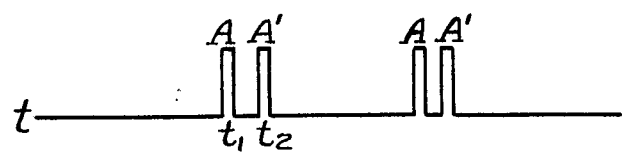
FIG. 3 shows a pulse versus time diagram showing the relationship between the pulse generated by a normal level of light versus the delay pulse generated by a low level of light.

FIG. 3 shows a pulse versus time diagram wherein pulse A shows the peak or coincidence signal emanating from module 12 when the light level is normal and A' shows the delayed pulse emanating from module 12 when the light level is sub-normal causing delay in response of cells 12a and 12b. The delay is illustrated as the distance between $t_1$ and $t_2$ on the time pulse diagram of FIG. 3. The scanning of the mirror 17 causes the pulse to be repeated periodically. Thus A and A' are shown twice; the latter showing representing the scanning mirror 17 picking up the image upon its return.

Figure 4:
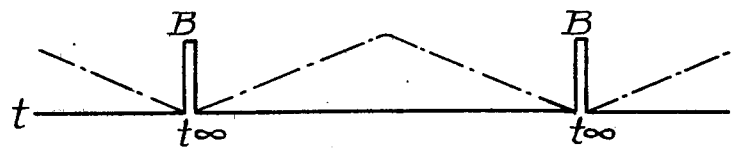
FIG. 4 shows a pulse versus time diagram for an object which is in focus at infinity. Superimposed thereon is a dot dash line for the mirror scanning locus where each end of the mirror travel is at the infinity pulse positions and half-way therebetween is the near focus position.

Turning to FIG. 4 the reference pulse B is shown on the time pulse diagram and superimposed thereon it dot dash line is the scanning path of the mirror. That is to say that, pulse B occurs at infinity when the mirror position is as shown in FIGS. 1 and 2 (on the low point of eccentric disk 19) as hereinbefore described. Halfway between the first pulse B and the second pulse B the mirror scan path peaks indicating that the mirror has turned around at the other end of its travel (the near focus position).

Figure 5:
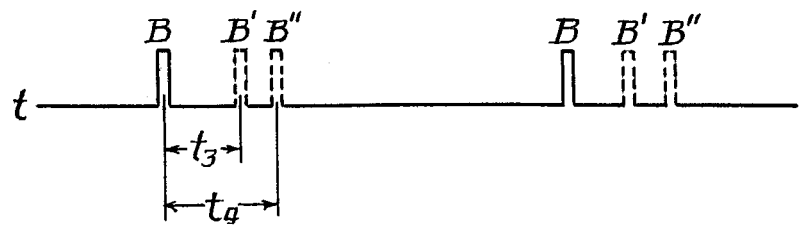
FIG. 5 shows a pulse time diagram for the reference pulse B under conditions of normal light, B' under conditions of lower light and B'' under conditions of even lower light.

FIG. 5 shows a time pulse diagram wherein the reference pulse B illustrates normal light conditions and pulse B' indicates a lower level of light condition which results from a delay in pulse B caused by the compensating device 23 and pulse B" is used to show an even lower light level condition which results in a greater delay in time. Thus it can be seen that under normal conditions the reference pulse operates like the prior art devices but under low level light conditions. The reference pulse can be delayed accordingly in order to compensate for the time necessary for the automatic focusing device to respond.

While the invention has been shown with a rangefinding automatic focusing device and a specific compensating circuit, the concept broadly includes any monitoring device to compensate for varying conditions of light emanating from the subject by introduction of a delay in the reference pulse which is proportional to the delay caused by the lack of light intensity in the detector peak coincidence signal pulse. In its broader aspects the invention covers compensating devices which can be applied to any automatic focusing device which relies upon a photo responsive cell and should include systems which are not rangefinding systems but merely dither a photo responsive cell for peak signal as such systems suffer from the same infirmity as the system hereinbefore described under conditions of low light level.

As those skilled in the art will no doubt appreciate many changes, refinements and modifications can be made to the construction and execution of an automatic focusing compensation system and it is therefore contemplated that the claims which follow will cover all the various combinations, permutations and arrangements that are possible.

It is claimed that:

1. A camera with a lens adapted to be used for automatic focusing comprising an automatic focusing detection means including a photo responsive cell being cyclically subjected to light emanating from a subject for detection of a maximum light intensity for determination of the distance of the subject from the camera, a reference pulse generating means associated with said photo responsive cell to periodically generate a pulse indicative of a condition of such cycling and light sensitive means responsive to the intensity of the light emanating from the subject connected to control the timing of the reference pulse so that a predetermined amount of delay may be added to reference pulse proportional to the light level of light from the subject.

2. The camera of claim 1 wherein said photo responsive cell is cyclically subjected to light by interposing a light deflecting means in the optical path from the subject to said photo responsive cell said light deflecting means being dithered at a predetermined rate.

3. The camera of claim 2 wherein said light deflecting means is a part of a rangefinder apparatus which includes a fixed optical path from the subject to the photo responsive cell whereby the light transmitted along the fixed optical path and the deflected optical path are compared such that a peak power signal is issued when coincidence of light intensity occurs.

4. The camera of claim 1 wherein said light sensitive means is a photo resistive element.

5. The camera of claim 1 wherein said light sensitive means includes circuitry for delaying the reference pulse said circuitry including a variable resistance and a one shot multi vibrator.

6. The camera in claim 5 wherein said variable resistance defines the time constant of said one shot multi vibrator thereby delaying the reference pulse accordingly.

7. The camera of claim 1 wherein said light sensitive means is adapted to have a response frequency substantially identical to that of said photo responsive cell.

* * * * *